US008649098B2

(12) United States Patent
Ruhle et al.

(10) Patent No.: US 8,649,098 B2
(45) Date of Patent: *Feb. 11, 2014

(54) COLLIMATING OPTICAL MEMBER FOR REAL WORLD SIMULATION

(75) Inventors: Frank Ruhle, Valhalla, NY (US); Paul Weissman, Brewster, NY (US)

(73) Assignee: Optical Resolutions, Inc., Brewster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,354

(22) Filed: May 2, 2011

(65) Prior Publication Data

US 2012/0147465 A1    Jun. 14, 2012

Related U.S. Application Data

(63) Continuation of application No. 10/580,362, filed on May 23, 2006, now Pat. No. 8,305,690, which is a continuation-in-part of application No. 10/723,395, filed on Nov. 26, 2003, now Pat. No. 6,853,491.

(60) Provisional application No. 60/333,041, filed on Nov. 27, 2002.

(51) Int. Cl.
*G02B 27/14*    (2006.01)
*G02B 27/10*    (2006.01)
*G02B 5/30*    (2006.01)
*G02F 1/1335*    (2006.01)
*G02B 27/01*    (2006.01)

(52) U.S. Cl.
CPC ................... *G02B 27/0172* (2013.01)
USPC ...... 359/630; 359/633; 359/485.01; 359/618; 349/11; 349/98

(58) Field of Classification Search
USPC ......... 359/618, 626, 629–631, 633, 485–487; 349/11, 13, 98, 115
See application file for complete search history.

(56) References Cited

U.S. PATENT DOCUMENTS 6,583,491 B1 * 6/2003 Huang et al. .................. 257/532

* cited by examiner

*Primary Examiner* — Jack Dinh
(74) *Attorney, Agent, or Firm* — Gerow D. Brill

(57) ABSTRACT

A collimating image-forming apparatus comprising a first linear polarizer is disclosed. A first quarterwave plate is disposed adjacent the first polarizer and has its fast and slow axes at substantially 45° to the plane of polarization of the first polarizer. The apparatus further comprises a beam-splitting curved mirror having a convex surface adjacent the first polarizer and facing towards the first quarter-wave plate, a second quarter-wave plate adjacent the concave side of the curved mirror, the second quarterwave plate having its having its fast and slow axes oriented with respect to the corresponding axes of the first quarter-wave plate at angles substantially equal to a first integral multiple of 90°, and a reflective-transmissive polarizing member adjacent the second quarter-wave plate. A second linear polarizer is adjacent the reflective-transmissive polarizing member, the second linear polarize: having its plane of polarization oriented with respect to the plane of polarization of the first linear polarizer at an angle substantially equal to a second integral multiple of 90°, both of the multiples being even or both being odd.

13 Claims, 4 Drawing Sheets

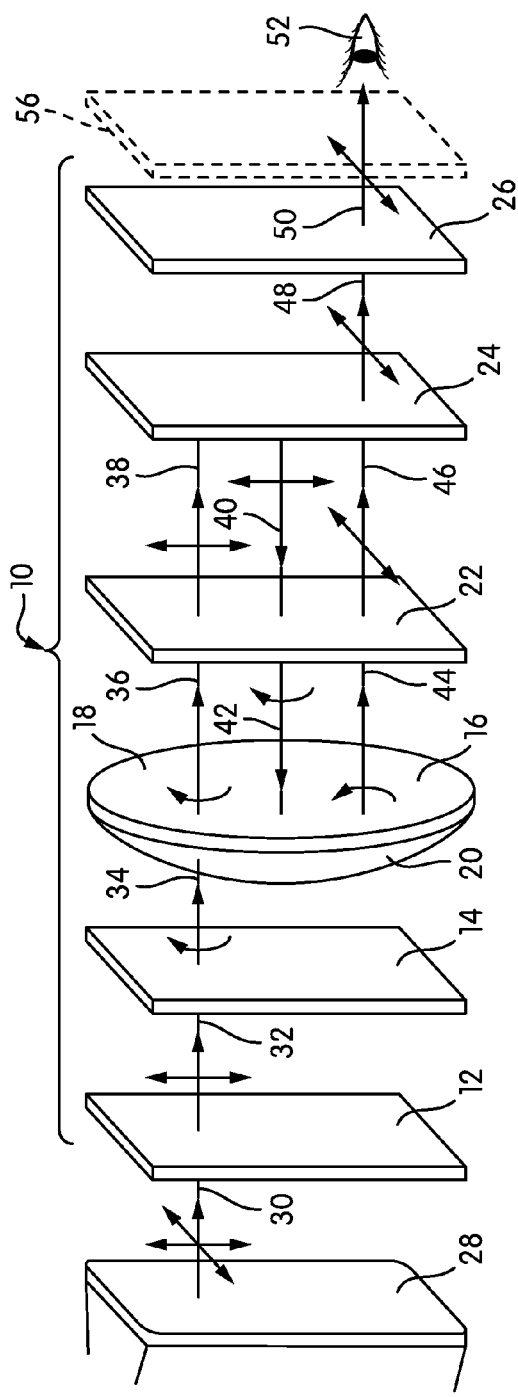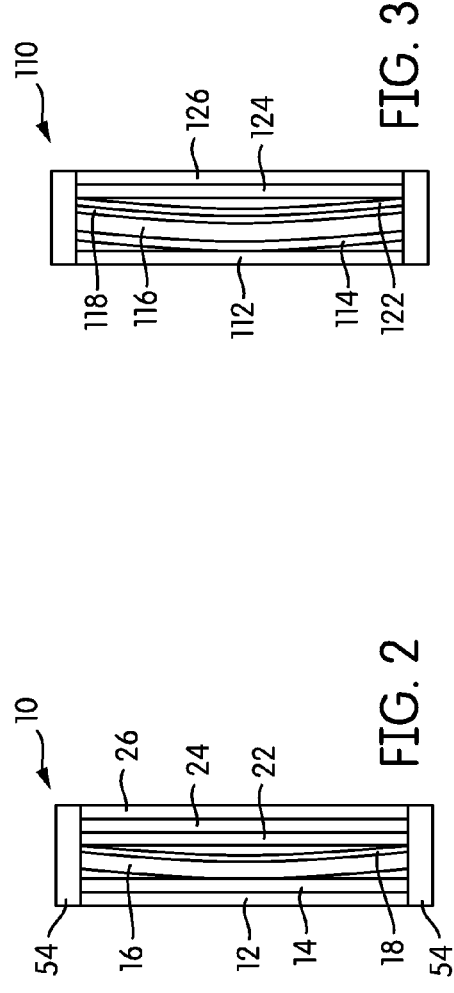

COLLIMATING OPTICAL MEMBER FOR REAL WORLD SIMULATION

CROSS-REFERENCE TO RELATED APPLICATIONS

This application is a continuation of U.S. application Ser. No. 10/580,362 filed on May 23, 2006 which was a of a continuation-in-part of U.S. application Ser. No. 10/723,395, filed Nov. 26, 2003, which claims benefit of a provisional of U.S. application No. 60/333,041, filed Nov. 27, 2002, the disclosures of each of which are hereby incorporated herein by reference thereto.

TECHNICAL FIELD

The present invention relates to collimating displays for simulators for presenting objects that appear to be at a great distance.

STATEMENT REGARDING FEDERALLY SPONSORED RESEARCH OR DEVELOPMENT

Not-Applicable.

BACKGROUND

Simulation of the real world is implemented in a wide variety of applications ranging from vehicle training simulators to video games. The simplest simulators are those used, for example, in video games. Generally, such simulators utilize a video display presented on a cathode ray tube monitor or a liquid crystal display. Such displays are meant to simulate the appearance of an outside world view seen through a window. The analog of a real world window in a two-dimensional display may be, for example, the face of the liquid crystal display. The display has dimensionality, motion characteristics and some perspective characteristics similar in some respects to those of a video image produced by a video camera. However, such displays are merely two-dimensional, and thus, because they are in only two dimensions and not three dimensions, do not exhibit any responsiveness to, for example, head motion. Accordingly, images presented on these sorts of systems lack realistic image change responses to head movement, eye movement and the like. In addition, such displays subtend a relatively narrow angular section of the field of view of a person observing the same. Thus, typically, a person observing one of these two-dimensional displays, typically sees a small display surrounded by a much larger view of the real world For example, if one viewing the real world through a window moves one's head to the right or the left, an image which is at a great distance from the observer will appear to move to the right or left within the window. In other words, as the viewer moves his head or his eye, the scene through the window will change and the object will appear to be stationary even though the observer is moving. This is in contrast to a directly viewed cathode-ray tube display, such as that produced on a personal computer or television set, where the image is independent of user head movement.

A similar effect obtains in the case of user movement toward and away from the display. Such user movement results in radical changes in apparent image size. This is in contrast to the real world where objects at a relatively large distance (for example 100 meters) appear unchanged in size despite relatively small (for example 5-10 centimeters) head movements toward and away from the display.

The problem stems from the fact that the simulated scene on a display is located a relatively finite distance from the user, perhaps 40 cm. Accordingly, head movement of a few centimeters causes radical disparity between expected image position and actual image position. Nonetheless, such systems do enjoy a large measure of popularity in the civilian world, because the human brain is well trained by television to accept such displays. Nevertheless, such displays, while accepted by the human brain, fail to provide the numerous visual cues such as image movement, parallax, image size and the like, that inform and then guide reactions.

Accordingly, merely providing a two-dimensional picture-type display is not suitable for experience-based training, such as that required by aircraft pilots, watercraft pilots, seaman and the like, fighting vehicle drivers, astronauts, drivers, and so forth, as well as gunnery, navigation and other personnel associated with vehicles and fixed installations such as bunkers, communication facilities and defensive/offensive gun emplacements. In addition remote prescience systems requiring real world image response to movements of the viewer.

One approach to the problem is the use of focusing optics which receive light from an image source and collimate it, making it appear that the image source is at infinity, or, at least, a great distance away. Because light coming from optics which are at a great distance is substantially parallel, collimation of an image source before presentation to the eye of a viewer is an effective strategy to present the viewer with effective real world simulation which will be useful to train reflexes, responses, and the like.

Such displays generally involve the placement of the image source near the focal point of a focusing optic. For example, if the image source is the face of a cathode ray tube (CRT), the CRT face plate may be positioned in the focal plane of the focusing optic. Accordingly, all light emanating from the face of the cathode ray tube and collected by the focusing optic will be presented as collimated, that is parallel bundles of light. While, in principle, refractive optics can perform this function, as a practical matter, the weight, thickness, and aberrations associated with refractive optics renders such an approach impractical. Accordingly, it is desirable to use reflective optics.

However, reflective optics present a multitude of challenges. For example, an image would generally be formed by having the source on the same side of the reflective optic as the observer. If the image is presented by folding the axis by the use of a partially reflective, partially transmissive planar optic, the assembly is clumsy and the presentation of adjacent assemblies complicated or impossible. While, in principle, one may replace the concave optic with a half-silvered concave member, a holographic equivalent thereof, or the like, the direct view of the original image may destroy the usefulness of the effect.

Since the 1960's, simulator displays have been available which address the above problems with varying degrees of success. For example, the collimating simulation optic sold under the trademark Pancake Window provided a solution to this problem.

Such systems are described in U.S. Pat. No. Re 27,356, and comprise a sandwich comprising a vertical polarizer, half-silvered concave optic, quarter-wave plate, planar beam-splitter, quarter-wave plate, and horizontal polarizer, which sandwich is coupled to an image source.

Generally, in accordance with this technology, an image source may be caused to pass light through a vertical polarizer. The light from the vertical polarizer passes through a concave half-silvered focusing optic, which, in turn, passes image source light through a quarter-wave plate which gives the light clockwise (or right) circular polarization characteristics. The circularly polarized light is reflected off a beam-splitter (a half silvered planar mirror) which causes it to have reversed or counterclockwise circular polarization. The light which is now circularly polarized in a counterclockwise (or left) direction goes through the quarter-wave plate again, emerging as horizontally polarized light, which is, in turn, reflected by the concave reflective optic and passes through the quarter-wave plate again which restores it to a bundle of counterclockwise circular polarized light, which is transmitted by the beam-splitter with unaltered polarization and finally passed through a quarter wave plate which passes the light with a horizontal linear polarization characteristic. The output image is then passed through a horizontal polarizer.

Light which passes directly from the image source through the vertical polarizer and through the various optical elements will be vertically polarized and will be blocked by the final polarizer which passes only the intended horizontally polarized light bundle.

Such systems have seen a wide variety of applications, including various vehicle simulators, such as aircraft simulators, space vehicle simulators, and so forth. Image sources used with such systems include cathode ray tube displays, models, painted displays, and so forth.

However, in theory, every transmission through and reflection off a half-silvered optical member and certain transmissions through a polarizer involve a nominal fifty percent loss of intensity. This loss occurs two times at the focusing optic, twice at the beam-splitter and once at the first of the two polarizers. Accordingly, significant losses occur, as appears more fully below.

In principle, some of the disadvantages of collimating optical members for simulators may be addressed by systems comprising a sandwich of elements comprising a vertical polarizer, a quarter wave plate, a concave half-silvered focusing optic, and a cholesteric polarizer. See, for example, U.S. Pat. No. 4,859,031. Generally, such systems work because the cholesteric polarizer has the characteristic of passing light with one circular polarization but transmitting light having the opposite circular polarization. However, such systems suffer from the inadequacy of the cholesteric polarizer (which has a relatively narrow range of reflectivity and requires the use of, for example, three layers of optics, resulting in a relatively thick assembly forming the collimating optical simulator member, and presentation of images with multiple color components which are out of register with each other).

SUMMARY OF THE INVENTION

The present invention provides a collimating image-forming apparatus comprising a first linear polarizer, a first quarter-wave plate adjacent the first polarizer and having its fast and slow axes at substantially 45° to the plane of polarization of the first polarizer. A beam-splitting curved mirror has a convex surface adjacent the first polarizer and facing towards the first quarter-wave plate. A second quarter-wave plate is adjacent the concave side of the curved mirror. The second quarter-wave plate has its fast and slow axes oriented with respect to the corresponding axes of the first quarter-wave plate at angles substantially equal to a first integral multiple of 90°. A reflective-transmissive polarizing member is positioned adjacent the second quarter-wave plate. A second linear polarizer is adjacent the reflective-transmissive polarizing member. The second linear polarizer has its plane of polarization oriented with respect to the plane of polarization of the first linear polarizer at an angle substantially equal to a second integral multiple of 90°, both of the multiples being even or both being odd.

BRIEF DESCRIPTION OF THE DRAWINGS

The implementation of the invention may be understood in conjunction with the written description of the invention contained herein taken together with the following drawings, which illustrate only several embodiments of the invention, and in which:

FIG. 1 is a diagrammatic exploded perspective view of the preferred embodiment of the inventive collimator, illustrating the position of the source and an observer;

FIG. 2 is a diagrammatic cross-sectional view of the inventive collimator illustrated in FIG. 1; and FIG. 3 is a diagrammatic cross-sectional view of an alternative embodiment of the inventive collimator similar to the view of FIG. 2.

DETAILED DESCRIPTION OF THE PREFERRED EMBODIMENT

Figure 4:
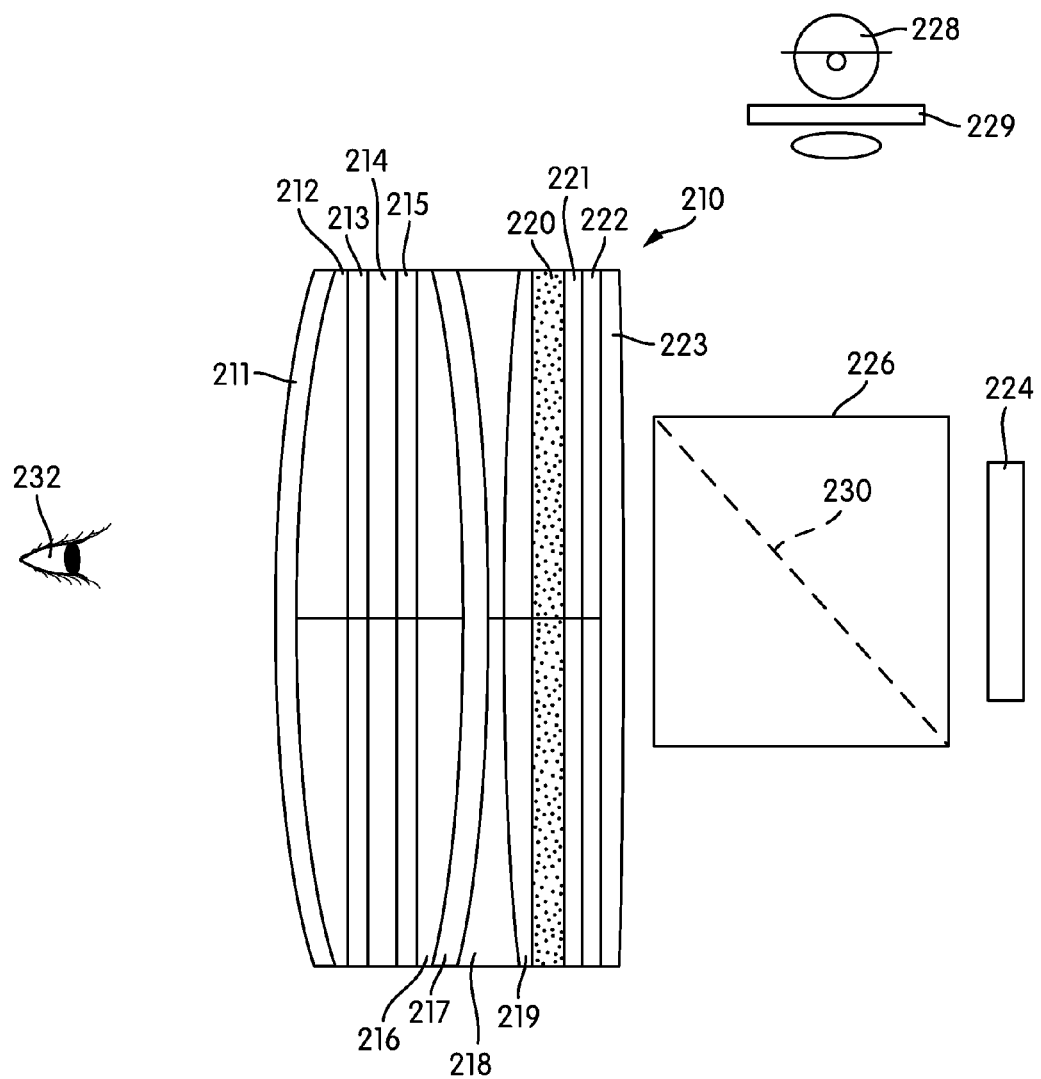
FIGS. 4-6 are diagrammatic cross-sectional views of embodiments illustrating alternative embodiments of the inventive collimator.

Referring to FIG. 1, in accordance with the invention, a collimator 10 comprises a polarizer 12, having a vertical polarization orientation. Polarizer 12 transmits light to a quarter wave plate 14 which outputs right circular polarized light to focusing mirror 16. Focusing concave mirror 16 is a concave mirror having a half silvered surface 18 coated on a concave glass substrate 20. Concave mirror 16 is optically coupled to a second quarter wave plate 22 which is optically coupled to both concave mirror 16 and a panchromatic reflective/transmissive polarizer 24 which is optically coupled to both quarter wave plate 22 and horizontal polarizer 26. In accordance with the invention, it is noted that the horizontal and vertical polarizers may be at different angles, provided that they are substantially at right angles to each other.

In accordance with the preferred embodiment of the invention, reflective/transmissive polarizer 24 is made using liquid crystal and photoimageable alignment materials coated in multiple layers onto a substrate such materials are available from Rolic Technologies Ltd. Reflective/transmissive polarizer 24 has the characteristic of reflecting vertically polarized light while transmitting horizontally polarized light.

Alternative structures providing the desired reflective/transmissive characteristic of polarizer 24 are multilayer biaxial structures such as those manufactured by 3M and known as DBAF Polarizer material.

Still another approach to achieve the desired reflective/transmissive characteristic of polarizer 24 is to use a wire grid polarizer, such as those manufactured by Moxtek.

It is noted that in accordance with the present invention, a panchromatic, that is full-color characteristic is desirable for polarizer 24, as well as the other elements in the inventive collimating display 10. In connection with this, it is noted that while optical elements 14 and 22 are referred to as quarter wave plates, they have different thicknesses at different wavelengths, but function to provide their effects across the visible spectrum to produce full-color simulation. This is on account of the fact that deviations in thickness from a true quarter wavelength are consistent in both optical elements 14 and 22 and the effects which they produce complement each other to function as described below with a full color characteristic.

The prior art collimating optical image forming apparatus as described in U.S. Pat. No. Re. 27,356 has been a basic component in a wide variety of optical display and simulation systems. Nevertheless, apparatus described in U.S. Pat. No. Re. 27,356 is improved in accordance with the invention as a result of the optical design of the present invention. In particular, the prior art optical design generally provides a low transmission throughput in the general area of 2% or less of the light from the image source being used to create the simulation. While the losses can be compensated, to some extent, by using a brighter image source, the more powerful illumination tends to increase the perception of certain other negative consequences of the basic optical design.

More particularly, one consequence is the appearance of darkened, color shifted areas in the field of view of the display. These areas are typically located in the corners of the display's field of view. In accordance with the invention, this problem is solved by structuring the elements to compensate for variation of the angle of incidence on the one quarter wave retarder elements. In the prior art, the angle of incidence is altered by the spherical beam splitting optical element used to collimate the image for rays of light relatively far removed from the principal axes of the display field of view.

The optical design of the present invention stems, in part, from the understanding that the result is that the state of polarization is altered in these areas, from the uniform linear polarization that is desired, to a linear polarization that is rotated in angle relative to the desired uniform linear polarization, causing, to varying degrees, development of elliptical polarization particularly in the areas at the furthest distance from the principal axes of the display field. While this would not appear to be a problem on its face, the alteration of the polarization state, particularly in these areas, results in decreased transmission through the corresponding areas of the linear polarizer that is next encountered by light passing through the system.

There is also a shift in color hue in these areas because light in some portion of the spectrum is attenuated to a greater extent than light in other portions of the spectrum. Other deficiencies prevalent in the usual embodiment of this type of apparatus are associated with the materials traditionally used in the manufacture of these devices. In particular the one quarter wave retarders and linear polarizers used are typically plastic film materials since heretofore these were the only such materials, available in sizes large enough to produce the large devices required of the typical application for such apparatus. Even so, for the largest devices, multiple pieces of the one quarter wave and linear polarizer materials must be used with the result that seams between the various pieces are noticeable in the display field of view. These plastic films must also be laminated onto other elements with various adhesives that are difficult to handle and which have the potential to suffer degradation with age. Furthermore, the materials from which one quarter wave retarders are made are typically stretched plastic films. Likewise, linear polarizer films also exhibit strain marks that are visible in the display's field of view. Since these materials are disposed at various angles in the construction of the apparatus, the result is a "cross-hatched" or "plaid" pattern of uneven illumination.

The improved apparatus which is the subject of this patent addresses the problems associated with the previously used materials by replacing the plastic film one quarter wave and linear polarizer films with liquid crystal materials directly coated onto other optical elements such as a flat beam splitting mirror incorporated in the inventive system as appears more fully below. One quarter wave retarders and linear polarizers formed by this technique avoid the necessity of having seams in large display devices and are essentially free of the strains that result in the "cross-hatched" or "plaid" pattern of non-uniform illumination. Use of such liquid crystal materials to form the optical elements of the inventive system, as described below, is known in the art and forms no part of the present invention.

In accordance with the present invention, one quarter wave retarders manufactured with these liquid crystal materials may incorporate characteristics tailored to correct the darkened corner phenomenon that is a consequence of the original optical design. More particularly, in accordance with the invention, the characteristic of the one quarter wave retarder can be modified in several ways. In one possible modification, the one quarter wave retarder can be made less sensitive to the angle of the incident light by creating multiple layers of liquid crystal materials, each layer having a different angular orientation normal to the surface upon which it is created. Another possible modification is to vary the thickness of the liquid crystal material in specific areas, thereby varying the amount of retardation in these specific areas. Another possible modification is to vary the alignment of the fast and slow access of the retardation materials in specific areas.

Such structures may be formed using materials available from Rolic Technologies Ltd.

In general, a combination of these three altered retarder characteristics are needed to correct the phenomenon for the specific optical design of any particular example of the display apparatus. For convenience, any combination of the elements formed with the new liquid crystal materials and the more traditional materials can be used depending upon the requirements of the final apparatus. Furthermore, optical retarders and linear polarizers formed from liquid crystal materials can be produced on plastic film substrates. For certain embodiments of the improved display device, this may be a more convenient format.

In general, the design objectives in implementing a combination of one or more of these three altered retarder characteristics is to maximize the uniformity of panchromatic transmission through the optical system.

The above-discussed improvements address many deficiencies of the display apparatus described in U.S. Pat. No. Re. 27,356. In addition, the design of FIG. 1 also addresses the low transmission value experienced on account of system attenuation of an image source, such as cathode-ray tube face 28. A basic change in the optical design addresses this issue with a resultant increase in theoretical transmission to approximately twelve and one-half percent, although actual values will be somewhat less due to inherent losses in the various optical elements, particularly polarizing optical elements 12 and 26.

In FIG. 1 the basic arrangement of the improved optical design for a collimator 10 is shown. The system may employ a plurality of image sources, which may comprise a cathode-ray tube (CRT) face 28, a projection screen, models, various types of projectors, or the like, or combinations of the same. For example, the image may first be projected upon a suitable screen. When a CRT is used as the image source, a screen may not be necessary, and the image projected on the face 28 of the CRT produces light 30 having both horizontal and vertical components. The first two elements after the screen or CRT is linear polarizer 12, which outputs vertically polarized light 32. Vertically polarized light 32 is sent to a one quarter wave retarder 14 which outputs right or clockwise circular polarized light 34.

Both linear polarizer 12 and quarter wave retarder 14 are located on the convex side of spherical beam splitting mirror 16. Linearly polarized light 32 from first linear polarizer 12 is converted to right (or clockwise) circularly polarized light 34 after passing through first quarter wave retarder 14. A portion 36 (typically fifty per cent) of this circularly polarized light then passes through the spherical beam splitting mirror 16. Spherical beam splitting mirror 16 can be an actual spherical optical element or alternatively can be a holographic equivalent as described in U.S. Pat. No. 3,940,203.

Circularly polarized light 36 then passes through second one quarter wave retarder 22 and exits as vertically polarized light ray bundles 38. As can be seen in FIG. 1, quarter wave retarder 22 is located on concave side of spherical beam splitting mirror 16. As a result of passing through second one quarter wave retarder 22, circularly polarized light 36 is converted to linearly polarized light 38, which is then incident on a reflective-transmissive polarizer 24, oriented such that vertically linearly polarized light 38 is reflected back as light ray bundles 40 through second one quarter wave retarder 22 to emerge as right circularly polarized light 42. Thus, quarter wave retarder 22 has again converted the linearly polarized light to circularly polarized light which is then partially transmitted and partially reflected by spherical beam splitting mirror 16.

A reflective-transmissive polarizer is an optical element that will reflect linearly polarized light aligned with a particular axis of the reflective-transmissive polarizer and will transmit linearly polarized light that has its plane of polarization oriented at 90 degrees to the polarization plane of linearly polarized light that is reflected by the reflective-transmissive polarizer.

Portion 44 of the light that is reflected by spherical beam splitting mirror 16 is now collimated forming an image with focus at infinity (i.e. a collimated image appearing to originate at infinity, or at least a comparatively great distance depending on the values of the optical components and the positions of the same). This is the case because the distance between light emitting CRT screen or face 28 and reflective-transmissive polarizer 24 plus the distance between reflective-transmissive polarizer 24 and convex mirror 16 is approximately equal to the focal length of convex mirror 16.

This collimated, left (or counterclockwise) circularly polarized light 44 then passes through second one quarter wave retarder 22, where it emerges as horizontally linearly polarized light 46. In other words, the plane of linear polarization is now at 90 degrees with respect to the linearly polarized light that resulted from circularly polarized light 38 and 40 that passed through spherical beam splitting mirror 16, and that first passed through second quarter wave retarder 22. This collimated horizontally linearly polarized light 44 now passes through reflective-transmissive polarizer 24 as light 48, which forms the image to be viewed.

If desired, optional polarizing filter 26 may be used to filter the light a second time to produce light 50 to the eye 52 of a user. A polarizing filter 26 has the effect of removing unwanted stray and feed-through images, such as vertically polarized light which may travel directly from face 28 through optical elements 12, 14, 16, 22 and 24 and light entering the optical system from the direction of the user 52 traveling towards the reflective transmissive polarizer 24.

Besides the greater transmission value of the improved apparatus, there is also a reduction in the intensity of ghost images inherent in display devices of this type due to "bleed through" of the original uncollimated image that is incompletely rejected by the various polarizers. The effect of these ghost images can be further reduced by either using an "off axis" or "tilted" optical design as described in U.S. Pat. No. 4,163,542 as an alternative or in addition to employing final linear polarizer 26 positioned to receive the output of reflective-transmissive polarizer 24 as shown in FIG. 1.

The preferred materials for the manufacture of this improved display apparatus are liquid crystal materials. These materials allow the production of reflective-transmissive polarizers of sufficient size and quality to make large displays practical while avoiding the seams and other problems associated with more traditional materials. Use of the liquid crystal materials for the one quarter wave retarders in the improved apparatus also allows the same techniques to be used for the fabrication of the above structures for correction of darkened areas due to angle of incidence considerations on the one quarter wave retarders to be applied to the improved apparatus. For some display devices it may be more convenient to use one quarter wave retarders, linear polarizers and reflective/transmissive polarizers that are not manufactured using liquid crystal materials, for example wire grid type reflective-transmissive polarizers.

As illustrated in FIG. 2, optical elements 12, 14, 16, 22, 24 and 26 may be held within a frame 54.

Because liquid crystal materials or other similar materials can be directly coated on the various optical elements, an alternate and potentially more compact embodiment of the improved collimator 110 may be produced, as illustrated in FIG. 3. In the embodiment of FIG. 3, polarizer 112, reflective-transmissive polarizer 124 and polarizer 126 perform substantially the same function as polarizer 12, reflective transmissive polarizer 24 and polarizer 26 in the FIG. 1 embodiment. However, quarter wave plates 14 and 22 are replaced by quarter wave coatings 114 and 122 coated directly on convex mirror 116.

In accordance with the invention, it may be desirable to remove the polarization characteristic of the output of the collimator 10 or 110. This allows the simulator to be used with systems that have polarization characteristics, such as certain types of helmet-mounted head-up displays, polarizing sunglasses, and so forth. To this end a pseudo-depolarizer may be used. Several birefringent retarders placed in series at various angles to one another have the effect, on an incident beam of linearly polarized white light, of making different wavelength components to emerge with different polarization forms. The polarization states of the emerging beam are so diverse that the beam has many characteristics of an unpolarized beam. Such stacks of retarders may be used to "depolarize" light. While light of any one wavelength remains polarized, the combined effect of all wavelengths roughly simulates depolarization. Such a stack is thus known as a pseudo-depolarizer. Such a pseudo-depolarizer 56 may be used to adapt the inventive system to use with such accessories having a polarizing characteristic or sensitivity. Pseudo-depolarizer 56 comprises a stack of chromatic retardation plates several hundreds of microns thick so that the light output is comprised of a large number of polarization states resembling unpolarized light.

Another improvement in the new optical design described above is the use of a projection source that is linearly polarized. In this case, the projection screen is made from typical screen materials which diffuse the polarized light from the projector essentially resulting in non-polarized light, is replaced with a screen fabricated with liquid crystal materials such that the direction of diffusion is controlled, thereby largely maintaining the linear polarization of the projector. The fabrication of such liquid crystal screens is made in accordance with conventional techniques and forms no part of the present invention. This approach also allows the elimination of the first linear polarizer on the convex side of the spherical beam-splitter which results in a greater overall transmission value for such systems. While it is most convenient to fabricate the improved projection screen utilizing liquid crystal materials, any method of fabricating a screen with a controlled direction of diffusion sufficient to largely maintain the polarization of the projector may be employed.

The embodiments of the invention illustrated in FIGS. 1-3 use a cholesteric spherical mirror (in the illustrated example a spherical beamsplitter) as the optically active member to form a collimated, or near collimated image of a source. Although the spherical mirror corrects for some aberrations (for example chromatic), this solution leaves other aberrations (such as field curvature) uncorrected.

When a spherical mirror is used, and the eye is placed at the center of curvature, several aberrations are minimized or eliminated, such as coma. In this case, if the image surface is flat the distortion is zero and the field is de-focused due to field curvature, if the image surface is curved the distortion is not corrected. Importantly, in both cases spherical aberration is not corrected. Furthermore, it is not always desirable to place the eye at the center of curvature which results in other aberrations such as astigmatism and coma.

The embodiment of FIG. 4 is aimed at addressing optical aberrations. In addition to reducing optical aberrations, there are other factors which are addressed in the embodiment of FIG. 4. These relate to the robustness of the design. A spherical beamsplitter is coated with metal or a dielectric layer to cause the surface to reflect approximately half of the light. These coatings can break down, over time, with exposure to air and/or ultraviolet radiation/or exposure to elements such as water.

The design of FIGS. 1-3 also comprises several discrete separable components, which may move with respect to each other. Likewise, the spaces between the components can become contaminated with elements such as water or dust, which can cause various problems, such as mildew, compromised transmissivity, distortion and so forth. While the FIG. 1 design may be sealed with O rings or a sealant material and nitrogen purged to address these environmental problems, such an approach does nothing to improve the aberrations noted above.

Most common ordinary mirrors (non-optical type such as household mirrors) are coated on the back side of the glass with silver. The silver can be chemically deposited and protected by applying paint over the back of the silver coating. These are generally called rear surface mirrors. When this arrangement is used on the rear surface of an element which also functions as a reflector, such mirrors are referred to as Mangin mirrors, after the inventor of the same. These mirrors are used in telescopes to perform some aberrational correction.

In accordance with the embodiment of the invention illustrated in FIG. 4, a partially reflective coating or layer 224 is completely deposited on the convex side of element 216 or the concave side of element 218 covered by optical cement which fills all the space between the partially reflective layer 224 and the refractive medium on opposite sides of reflective layer 224. While one may say that the reflective layer is immersed in cement, and this is the use of the term in the art, it is noted that the cement in a functioning device has set and is solid. In the FIG. 1-3 embodiment, an assembly of endplates, polarizer, quarter-wave plates, and flat beamsplitter are cemented together to form a type of birefringent sandwich assembly. In the embodiment of FIG. 4, the birefringent sandwich assembly is cemented to the spherical beamsplitter. In the FIGS. 1-3 embodiment, a linear polarizer is cemented between two end plates. In the FIG. 4 embodiment of the invention, the linear polarizer is cemented, using optical cement such as Epoxy Technologies 301FL to the birefringent sandwich and the spherical beamsplitter. Thus, the three components become a monolithic structure.

One of the most desirable attributes of the spherical mirror employed in the present invention is that it reflects all colors equally and thus has no color aberrations. The spherical mirror also has an effective optical index of two. This means that many of the aberrations are low when compared to an element of like refractive power made from common optical glass.

By immersing the spherical mirror the system loses substantially perfect color correction, but resulting benefits outweigh the loss. In order to correct for the color, color correcting elements are introduced. These are flints or fling glasses. Flint glasses are combined with crown glasses to balance color aberrations. Each surface contributes to the Petzval sum. The refractive index combined with the curvature of the surfaces must be adjusted to control the Petzval sum which is related to the general field curvature. The spherical correction in eyepieces is generally left under-corrected. However, this aberration can lead to what looks like astigmatism when the eye is off center with respect to the optical axis. Moreover, astigmatism must be corrected to a degree that the intermediate focus, that focus between the tangential and sagittal, is commensurate with the clear representation of the maximum frequency of the image being observed. Coma is also corrected and is balanced with the astigmatism correction.

It is desirable to have flat surfaces within the optic to embed the polarizer, and the quarter-wave material.

FIG. 4 shows a device 210 illustrating one embodiment of the invention. In this embodiment all the curved surfaces are spherical. An anti reflection coating 211 is deposited on convex-plan element 212, which is indirectly in optical communication with a reflective transmissive polarizer 214 oriented to transmit horizontally oriented linearly polarized light and reflect vertically oriented linearly polarized light. Between convex plano element 212 and reflective transmissive polarizer 214, a linear polarizer 213, which is horizontally oriented to "clean-up" any bleed through light passing through the reflective transmissive polarizer is deposited or constructed on reflective transmissive polarizer 214. A plano convex element 216 indirectly receives light from reflective transmissive polarizer 214. Between reflective transmissive polarizer 214 and the plano convex element 216 is a quarter-wave plate 215 oriented with a slow axis at 45 degrees to the vertical axis. After the Plano convex lens 216 is a concave beamsplitter 217 which is followed by a concave-concave element 218. Beamsplitter 217 can be deposited on either of the adjacent surfaces of concave-concave element 218 or plano convex element 216. Concave-concave lens 218 is followed by a convex plano element 219. Convex plano element 219 is followed by a quarter wave plate 220, which has its slow axis rotated at a 90 degree angle to the slow axis of quarter wave plate 215. Quarter wave plate 220 is followed by linear polarizer 221, which, is followed by protective flat plate 222, which may also be provided with an antireflection coating 223, similar to antireflection coating 211.

During operation of the inventive optics, light is emitted by a source 228. The light is then plane polarized by a filter 229 after which the light enters cube 226. Within the cube is a partially reflecting surface 230 which reflects part of the plane polarized light so that it is now going towards a pixelated image source spatial light modulator (SLM) 224. In accordance with the present invention, the preferred SLM is a liquid crystal on silicon type SLM (LCoS).

The light exits the cube and enters SLM 224 were the plane polarized light is coded into two plane polarized vectors which are at right angles to one another. In SLM type devices, the amplitude of light is not generally modified. Rather, the plane of the polarization is changed in order to impart information to light leaving a particular pixel on the SLM. While, in principle, the degree to which polarization has been changed may be an analog indicator of light amplitude, generally, such devices work by encoding polarization as a series of on-off pulses. More particularly, polarization is used to encode a digital number which is indicative of the amplitude of the signal leaving a pixel. In other words, amplitude of the light exiting the pixel is encoded with a digital signal in the time domain.

In connection with this, it is noted that the actual intensity of light leaving a given pixel remains constant, but the encoded signal is encoded as polarization information, and, more particularly, as a series of ones and zeros forming a signal, or a series of, for example, vertically (for example, this may indicate a one) and horizontally (for example, this may indicate a zero) polarized light which encodes the amplitude information digitally.

Light reflecting off the SLM is thus coded with a pixelated picture. The light reflected from the SLM reenters the cube 226 along the same path as it entered but is traveling away from SLM 224. The light again encounters the partially reflecting surface 230 and a portion of this coded information bearing light passes through the coating and continues traveling towards the left. The coded light exits cube 226 and travels toward the inventive lens assembly 210. The coded light enters the inventive lens assembly 210 through antireflective coating 223 and protective flat plate 222.

The coded light is incident upon linear polarizer 221 where the coded light is de-coded by the absorption of one of the plane polarized vectors. The vector passed has a transmission axis in the vertical plane. The light then is incident upon quarter wave plate 220 and becomes circularly polarized. The light then passes through plano convex lens 219, and concave lens 218. It is then incident upon the partially reflecting surface of spherical beamsplitter 217. A portion of the light passes through spherical beam splitter 217, and convex plano lens 216, and is incident on quarter wave plate 215. This light is returned with a polarized vector with an orientation substantially identical to the orientation which it had when it left linear polarizer 221.

The light is then incident on transmissive reflective polarizer 214, which is oriented with its transmission vector horizontal and its reflection vector vertical. The light is then reflected by transmissive reflective polarizer 214 and is incident on quarter wave plate 215 and is circularly polarized. The circularly polarized light then goes through convex plano lens 216 and is incident on spherical beamsplitter 217. A portion of this circularly polarized light is reflected by spherical beam splitter 217. This reflected portion of the circularly polarized light then goes through convex plano lens 216 and is incident on quarter wave plate 215. The light, after passing through quarter wave plate 215 is linearly polarized with the transmission vector having a horizontal orientation. The linearly polarized light is then incident on transmissive reflective polarizer 214 and passes through and is incident on linear polarizer 213, with a transmission vector aligned to be the same as the transmission vector of transmissive reflective polarizer 214, and passes through linear polarizer 213. The light then passes through convex plano element 212 and antireflection coating 211 exiting the inventive lens assembly 210. The light bearing the image then travels to the eye 232 of the observer.

Figure 5:
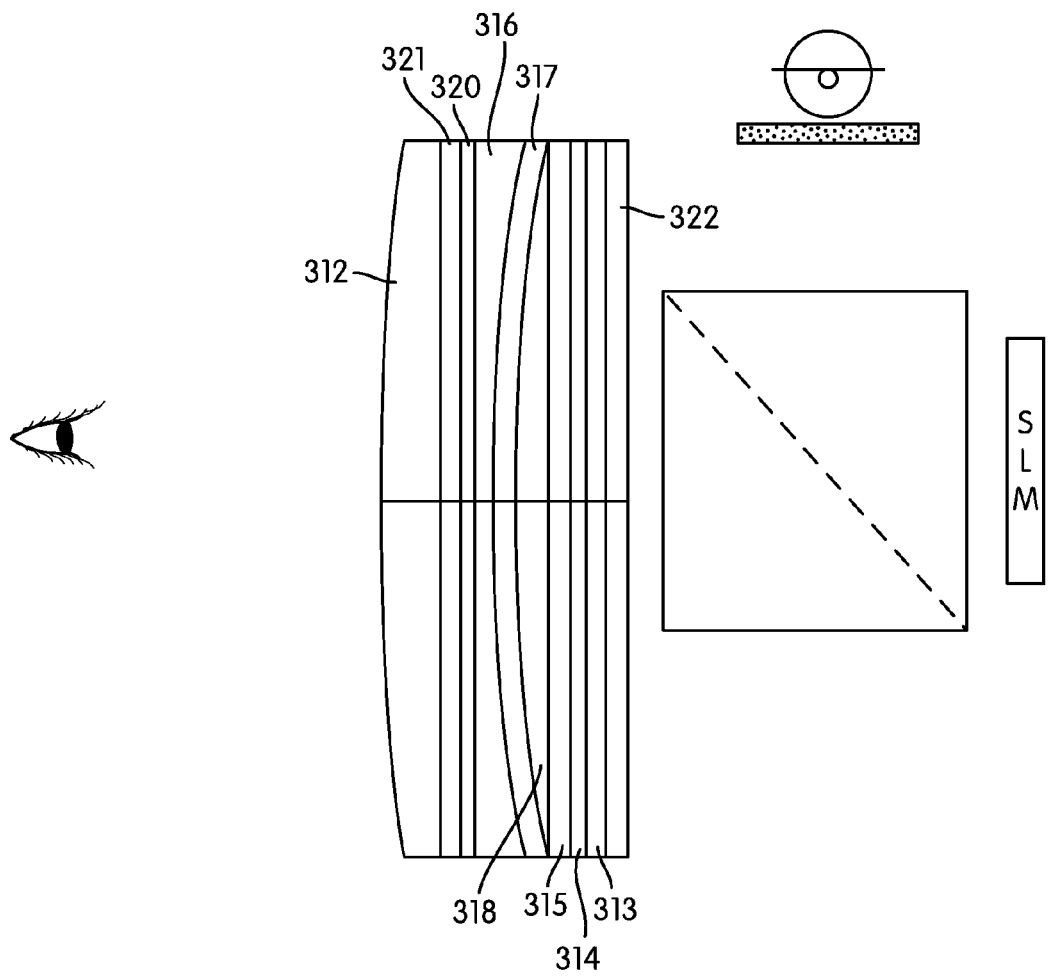
Figure 6:
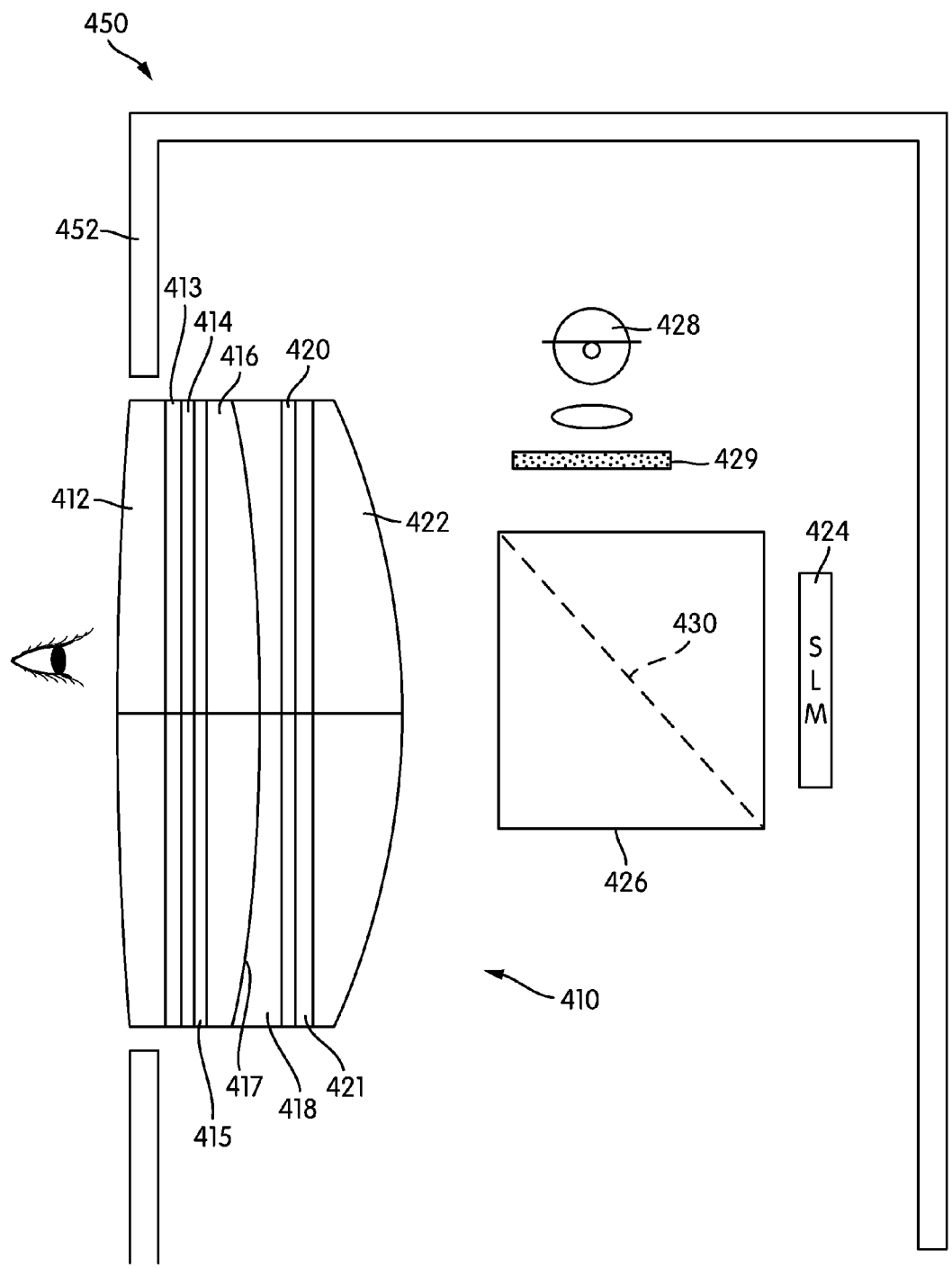

In FIGS. 5 and 6, parts performing analogous similar functions to the embodiment illustrated in FIG. 4 are given numbers which are 100 and 200, respectively, apart from the corresponding part in FIG. 4.

The operation of the embodiment of FIG. 5 is substantially identical to that of FIG. 4, except that the order of a section of the device has been reversed, without compromising the operation of the system. This gives the advantage of increasing the back focal length by placing the spherical beamsplitter optically closer to the focal plane of the SLM. More particularly, linear polarizer 321, reflective transmissive polarizer 314, quarter-wave plate 320, plano concave refractive element 316, spherical beamsplitter 317, plano convex refractive element 318, quarter wave plate 315, and linear polarizer 313 are reversed. Antireflection coatings may be used in this embodiment also, the same being placed in positions analogous to that shown in the FIG. 4 embodiment.

The embodiment illustrated in FIG. 6 is corrected for all the aberrations of the embodiment illustrated in FIG. 4. However, the system has also been corrected for distortion by using aspheric optics. This is achieved through the use of a pair of aspheric surfaces. In principle, the solution can also be obtained with a greater number of aspheric surfaces.

The operation of the embodiment illustrated in FIG. 6, is identical to that as explained in connection with the embodiment illustrated in FIG. 4. However, the correction of distortion which is achieved in the FIG. 6 embodiment may be understood by considering that the objective is to hold the corrections of the FIG. 4 design, while introducing additional corrections desired in connection with the design of FIG. 6. More particularly, in the nonaspheric design of FIG. 4, it is possible to correct for astigmatism, but distortion becomes large. Likewise, it would be possible to correct for distortion, but astigmatism would become problem. By introducing the possibility that a spheric surfaces may be incorporated into the design, it becomes possible to simultaneously solve for greatly reduced distortion and astigmatism. Such solution is done using conventional lens design software, such as the Zemax program.

FIG. 6 shows a device 410 illustrating one embodiment of the invention. An anti reflection coating 411 is deposited on aspheric convex-plano element 412, which is indirectly is in optical communication with a reflective transmissive polarizer 414 oriented to transmit horizontally oriented linearly polarized light and reflect vertically oriented linearly polarized light. Between convex-plano element 412 and reflective transmissive polarizer 414, a linear polarizer 413, which is horizontally oriented to "clean-up" any bleed through light passing through the reflective transmissive polarizer is deposited or constructed on reflective transmissive polarizer 414. A plano convex element 416 indirectly receives light from reflective transmissive polarizer 414. Between reflective transmissive polarizer 414 and the plano convex element 416 is a quarter-wave plate 415 oriented with a slow axis at 45 degrees to the vertical axis. After the plano convex lens 416 is a concave beamsplitter 417 which is followed by a concave-concave element 418. Beamsplitter 417 can be deposited on either of the adjacent surfaces of concave-concave element 418 or plano convex element 416. Concave-concave lens 418 is followed by a convex plano element 419. Convex plano element 419 is followed by a quarter wave plate 420, which has its slow axis rotated at a 90 degree angle to the slow axis of quarter wave plate 415. Quarter wave plate 420 is followed by linear polarizer 421, which, is followed by protective aspheric lens 422, which may also be provided with an anti-reflection coating 423, similar to an antireflection coating 411.

During operation of the inventive optics, light is emitted by a source 428. The light is then plane polarized by a filter 429 after which the light enters cube 426. Within the cube is a partially reflecting surface 430 which reflects part of the plane polarized light so that it is now going towards a pixelated spatial light modulator (SLM) 424. In accordance with the present invention, the preferred SLM is a liquid crystal on silicon type SLM (LCoS). However, a rear illuminated LCD may also be used, dispersing with the need for a cube.

The light exits the cube and enters SLM 424 were the plane polarized light is coded into two plane polarized vectors which are at right angles to one another. In SLM type devices, the amplitude of light is not generally modified. Rather, the plane of the polarization is changed in order to impart information to light leaving a particular pixel on the SLM. While, in principle, the degree to which polarization has been changed may be an analog indicator of light amplitude, generally, such devices work by encoding polarization as a series of on-off pulses. More particularly, polarization is used to encode a digital number which is indicative of the amplitude of the signal leaving a pixel. In other words, amplitude of the light exiting the pixel is encoded with a digital signal in the time domain.

In connection with this, it is noted that the actual intensity of light leaving a given pixel remains constant, but the encoded signal is encoded as polarization information, and, more particularly, as a series of ones and zeros forming a signal, or a series of, for example, vertically (for example, this may indicate a one) and horizontally (for example, this may indicate a zero) polarized light which encodes the amplitude information digitally.

Light reflecting off the SLM is thus coded with a pixelated picture. The light reflected from the SLM reenters the cube 426 along the same path as it entered but is traveling away from SLM 424. The light again encounters the partially reflecting surface 430 and a portion of this coded information bearing light passes through the coating and continues traveling towards the left. The coded light exits cube 426 and travels toward the inventive lens assembly 410. The coded light enters the inventive lens assembly 410 through anti-reflective coating 423 and protective aspheric lens 422.

The coded light is incident upon linear polarizer 421 where the coded light is de-coded by the absorption of one of the plane polarized vectors. The vector passed has a transmission axis in the vertical plane. The light then is incident upon quarter wave plate 420 and becomes circularly polarized. The light then passes through plano convex lens 419, and concave concave lens 418. It is then incident upon the partially reflecting surface of spherical beamsplitter 417. A portion of the light passes through spherical beam splitter 417, and convex plano lens 416, and is incident on quarter wave plate 415. This light is returned to a polarized vector with an orientation substantially identical to the orientation which it had when it left linear polarizer 421.

The light is then incident on transmissive reflective polarizer 414, which is oriented with its transmission vector horizontal and its reflection vector vertical. The light is then reflected by transmissive reflective polarizer 414 and is incident on quarter wave plate 415 and is circularly polarized. The circularly polarized light then goes through convex plano lens 416 and is incident on spherical beamsplitter 417. A portion of this circularly polarized light is reflected by spherical been splitter 417. This reflected portion of the circularly polarized light then goes through convex plano lens 416 and is incident on quarter wave plate 415. The light, after passing through quarter wave plate 415 is linearly polarized with the transmission vector having a horizontal orientation. The linearly polarized light is then incident on transmissive reflective polarizer 414 and passes through and is incident on linear polarizer 413, with a transmission vector aligned to be the same as the transmission vector of transmissive reflective polarizer 414, and passes through linear polarizer 413. The light then passes through convex plano element 412 and anti-reflection coating 411 exiting the inventive lens assembly 410. The light bearing the image then travels to the eye 432 of the observer.

In accordance with the invention, it is contemplated that the inventive optical system, such as optical system 410 may be included in any one of a number of devices, such as a cellular telephone 450, being contained within the case 452 of cellular telephone 450. In the case of such a use, the user would put his eye up against the optical system 410 as illustrated in FIG. 6, in much the same manner that one would use a camera viewfinder. Other uses include virtual reality glasses, head up displays, and so forth.

In all of the examples of FIGS. 4-6, the contact surfaces are joined with an optical cement.

The range of the index of refraction of the cements is between 1.48 and 1.65. The cements can be a two part RTV such as Dow Sylgard 184, a two part optical cement such as Summers Labs C-59, or a UV curing cement such as Norland UV-63 epoxies such as Epoxy Technologies 301FL. The index of the cements may be altered by the addition of chemicals such as n-vinyl carbazole, to alter the reflectivity at the internal boundaries in a manner well known in the art.

Various sheet polarizers may be used in the assembly. These are the Polariod/3M sheet polarizer as well as those made by other manufactures that fall into two major categories, iodine sheet polarizer and dye sheet polarizer. These are combined with stretched plastic quarter wave material such as made by OptiGraphics (USA), or Nitto (Japan). When cementing between two plastic layers a cement other then a UV curing cement must be used.

In accordance with the invention several inventive collimators may be tiled or stacked to cover larger areas than can be covered by a single collimator. The result is to synthesize a larger collimator than would otherwise be possible.

While an illustrative embodiment of the invention has been described, it is, of course, understood that various modifications may be made without departing from the spirit and scope of the invention, which is limited and defined only by the appended claims. For example, one or more of the optical members may be replaced by flat sheets incorporating a holographic optical element and the entire assembly sandwiched together to form an exceedingly thin package. In addition, additional images from additional image sources may be introduced into the simulation created by the inventive system through the use of beam splitter mirrors interposed at an angle of 45 degrees in the optical path of the simulator so that the beam-splitter mirrors reflect light from the additional image sources along the optical path toward the observer. Such modifications are within the scope of the following claims which define the invention.

We claim:

1. An optical system for presenting virtual optical images of an image source outputting light in a forward direction at a desired apparent distance comprising:
   (a) a light polarizing image source;
   (b) a first linear polarizing element oriented to receive light from said image source and output first linearly polarized light having an orientation in a first direction, said first linear polarizing element being oriented in said first direction;

(c) a first elliptical polarizing member oriented in a second direction and positioned to receive said first linearly polarized light and output first elliptically polarized light, said first elliptically polarized light being oriented in a first elliptical direction;

(d) a partially transparent and partially reflective focusing member positioned to receive said first elliptically polarized light and transmit a portion of said first elliptically polarized light;

(e) a second elliptical polarizing member positioned to receive said portion of said first elliptically polarized light from said focusing member and transmit said portion of said first elliptically polarized light as second linearly polarized light, said second linearly polarized light being oriented in said first direction; and (f) a reflective-transmissive polarizer configured and positioned to reflect light having a linear polarization in said first direction and transmit light having a linear polarization in a direction transverse to said first direction, said second elliptical polarizing member being configured and positioned to convert linearly polarized light reflected in a rearward direction by said reflective transmissive polarizer into second elliptically polarized light with said second elliptically polarized light being polarized in said first elliptical direction, said partially transparent and partially reflective focusing member being positioned to reflect in a forward direction said second elliptically polarized light as third elliptically polarized light, said third elliptically polarized light having a second elliptical direction different from said first elliptical direction, and said second elliptical polarizing member being positioned to convert said third elliptically polarized light into third linearly polarized light, transmitting said third linearly polarized light in a forward direction, said third linearly polarized light being oriented in a second direction transverse to said first direction, whereby said reflective-transmissive polarizer transmits said third linearly polarized light in a forward direction.

2. An optical system as in claim 1, further comprising:

(g) a second linear polarizing element oriented to receive light from said reflective-transmissive polarizer, said second linear polarizing element being configured and positioned to transmit light having a linear polarization in said second direction.

3. An optical system as in claim 1, wherein said elliptical polarizing members are circular polarizing members.

4. An optical system as in claim 1, wherein said elliptical polarizing members are manufactured using a coating process.

5. An optical system as in claim 1, wherein said reflective-transmissive polarizer is formed of a liquid crystal material.

6. An optical system as in claim 1. Wherein said elliptical polarizing members are coated onto opposite sides of said partially transparent and partially reflective focusing member.

7. An optical system as in claim 1, wherein said elliptical polarizing members are circular polarizing members and said circular polarizing members are quarter wave plates.

8. An optical system as in claim 1, wherein said first and second elliptical polarizing members are one quarter wave retarders comprising liquid crystal materials configured to incorporate characteristics tailored to correct darkened corner phenomenon.

9. An optical system as in claim 1, wherein said first and second elliptical polarizing members are configured to incorporate characteristics tailored to correct darkened corner phenomenon.

10. An optical system as in claim 1, further comprising an image source comprising a polarized projector and a screen fabricated with liquid crystal materials that largely maintain the linear polarization of said projector.

11. An optical system as in claim 1, wherein said reflective-transmissive polarizer comprises a liquid crystal member.

12. An optical system for presenting virtual optical images of an image source outputting light in a forward direction at a desired apparent distance comprising:

(a) an image source;

(b) a first linear polarizing element oriented to receive light transmitted forwardly from said image source and output first linearly polarized light, said first linearly polarized light having a direction of polarization with an orientation in a first direction, said first linear polarizing element being oriented in said first direction;

(c) a first elliptical polarizing member oriented in a second direction and positioned to receive said first linearly polarized light and output first elliptically polarized light, said first elliptically polarized light being oriented in a first elliptical direction;

(d) a partially transparent and partially reflective concave mirror positioned to receive said first elliptically polarized light and transmit a portion of said first elliptically polarized light;

(e) a second elliptical polarizing member positioned to receive said portion of said first elliptically polarized light from said partially transparent and partially reflective concave mirror and transmit said portion of said first elliptically polarized light as second linearly polarized light, said second linearly polarized light having a polarization direction, substantially oriented in said first direction; and (f) a reflective-transmissive polarizer configured and positioned to reflect light having a linear polarization in said first direction and transmit light having a linear polarization in a direction transverse to said first direction, said second elliptical polarizing member being configured and positioned to convert linearly polarized light reflected in a rearward direction by said reflective transmissive polarizer into second elliptically polarized light with said second elliptically polarized light being polarized substantially in said first elliptical direction, said partially transparent and partially reflective concave mirror being positioned to reflect in a forward direction said second elliptically polarized light as third elliptically polarized light, said third elliptically polarized light having a second elliptical direction different from said first elliptical direction, and said second elliptical polarizing member being positioned to convert said third elliptically polarized light into third linearly polarized light, transmitting said third linearly polarized light in a forward direction, said third linearly polarized light being oriented in a second direction transverse to said first direction, whereby said reflective-transmissive polarizer transmits said third linearly polarized light in a forward direction, said first linear polarizing element being positioned between said image source and said first elliptical polarizing member, said first elliptical polarizing member being positioned between said first linear polarizing element and said partially transparent and partially reflective concave mirror, said partially transparent and partially reflective concave mirror being positioned between said first elliptical polarizing member and said second elliptical polarizing member, and said second elliptical polarizing member being positioned between said partially transparent and partially reflective concave mirror and said reflective-transmissive polarizer.

13. An optical system for presenting virtual optical images of an image source outputting light in a forward direction at a desired apparent distance comprising:
(a) a light polarizing image source;
(b) a first linear polarizing element oriented to receive light transmitted forwardly from said image source and output first linearly polarized light, said first linearly polarized light have a direction of polarization with an orientation in a first direction, said first linear polarizing element being oriented in said first direction;
(c) a first circular polarizing member oriented in a second direction and positioned to receive said first linearly polarized light and output first circularly polarized light said first circularly polarized light being oriented in a first circular direction;
(d) a partially transparent and partially reflective focusing member positioned to receive said first circularly polarized light and transmit a portion of said first circularly polarized light;
(e) a second circular polarizing member positioned to receive said portion of said first circularly polarized light from said partially transparent and partially reflective focusing member and transmit said portion of said first circularly polarized light as second linearly polarized light, said second linearly polarized light having a polarization direction substantially oriented in said first direction; and
(f) a reflective-transmissive polarizer configured and positioned to reflect light having a linear polarization in said first direction and transmit light having a linear polarization in a direction transverse to said first direction, said second circular polarizing member being configured and positioned to convert linearly polarized light reflected in a rearward direction by said reflective transmissive polarizer into second circularly polarized light with said second circularly polarized light being polarized substantially in said first circular direction, said partially transparent and partially reflective focusing member being positioned to reflect in a forward direction said second circularly polarized light as third circularly polarized light, said third circularly polarized light having a second circular direction different from said first circular direction, and said second circular polarizing member being positioned to convert said third circularly polarized light into third linearly polarized tight, transmitting said third linearly polarized light in a forward direction, said third linearly polarized light being oriented in a second direction transverse to said first direction, whereby said reflective-transmissive polarizer transmits said third linearly polarized light in a forward direction, said first linear polarizing element being positioned between said image source and said first circular polarizing member, said first circular polarizing member being positioned between said first linear polarizing element and said partially transparent and partially reflective focusing member, said partially transparent and partially reflective focusing member being positioned between said first circular polarizing member and said second circular polarizing member, and said second circular polarizing member being positioned between said partially transparent and partially reflective focusing member and said reflective-transmissive polarizer.

* * * * *